F. J. MADDEN.
HEADLIGHT FOR VEHICLES.
APPLICATION FILED MAY 21, 1910.
983,630.
Patented Feb. 7, 1911.
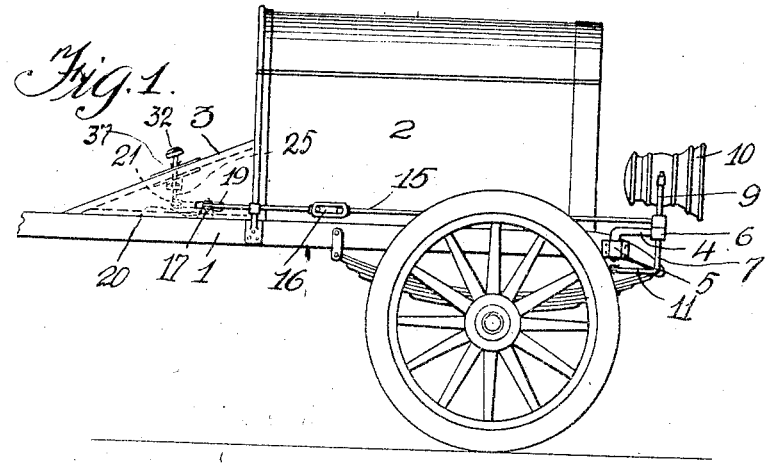
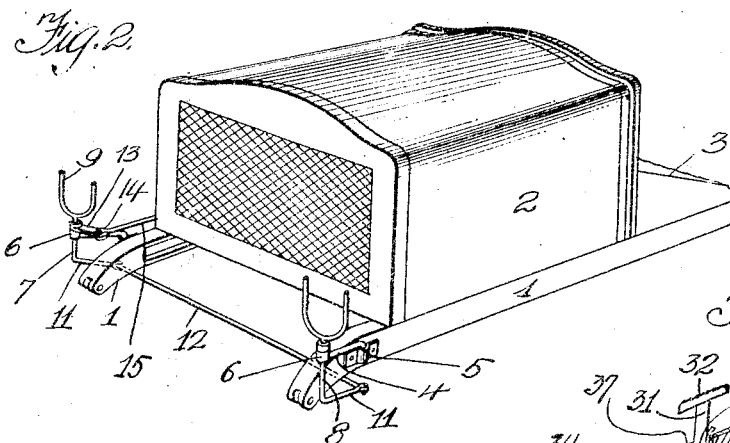
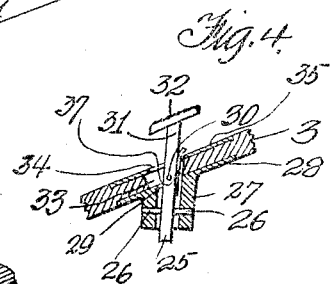
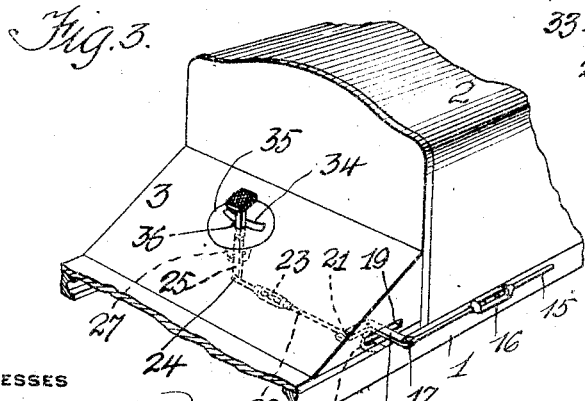
WITNESSES
Samuel Payne
R. H. Butler
INVENTOR
F. J. Madden
by
Attorneys.

UNITED STATES PATENT OFFICE.

FRANCIS J. MADDEN, OF DUQUESNE, PENNSYLVANIA.

HEADLIGHT FOR VEHICLES.

983,630.  Specification of Letters Patent.  Patented Feb. 7, 1911.

Application filed May 21, 1910. Serial No. 562,722.

*To all whom it may concern:*

Be it known that I, FRANCIS J. MADDEN, a citizen of the United States of America, residing at Duquesne, in the county of Allegheny and State of Pennsylvania, have invented certain new and useful Improvements in Headlights for Vehicles, of which the following is a specification, reference being had therein to the accompanying drawing.

This invention relates to headlights for vehicles, and the object of my invention is to provide a mechanism for moving the lamps or headlights of automobiles or other vehicles, whereby the lamps or headlights can be shifted so that the rays of light of the lamp or headlight will illuminate either the path to be traversed by the machine whether the same is traveling in a straight course or making a turn, or to illuminate the side of a road, street, or any object.

My invention aims to provide a lamp shifting mechanism that is entirely independent of the steering or operating mechanism of an automobile or other vehicle, thus permitting the operator to manipulate the lamps or headlights at night for observing territory within the vicinity of the machine, the automobile equipment which I employ being used to advantage by machines used by doctors in locating house numbers of a night. To this end, I provide an automobile with a lamp shifting mechanism that is simple in construction, applicable to various types of machines, durable, and capable of withstanding the vibrations of the machine, and highly efficient in facilitating the observing of objects or the steering of a machine by night.

The invention will be better understood by reference to the accompanying drawing, illustrating one embodiment of the invention, and wherein:

Figure 1 is a side elevation of a portion of an automobile provided with the lamp shifting mechanism. Fig. 2 is a perspective view of the lamp supports of an automobile. Fig. 3 is a perspective view of the footboard of an automobile showing a portion of the mechanism in connection therewith, and Fig. 4 is a cross sectional view of the foot-board.

Throughout the several views of the drawing like numerals of reference designate corresponding parts, and the reference numerals 1 denote the side frames of an automobile, said frames supporting among other things an engine hood 2 and an inclined foot-board 3 at the rear end of said hood.
The frames 1 at the forward ends thereof and upon the outer sides thereof are provided with forwardly projecting brackets 4 held in engagement with said frames by plates 5 riveted, bolted, or otherwise secured to said frames. The forward ends of the brackets 4 are provided with bearings 6 for vertical rock shafts 7 and 8, these shafts having the upper ends thereof provided with U-shaped supports 9 for lamps or headlights
10. The lower ends of the shafts 7 and 8 are provided with cranks 11 having the outer ends thereof pivotally connected by a rod 12. The shaft 7 has another crank 13 beneath the lamp support thereof, and this crank is pivotally connected, as at 14, to a reach rod 15 extending rearwardly along the side of the engine hood 2, said reach rod having a conventional form of turnbuckle 16 whereby it can be lengthened or shortened.

The rear end of the reach rod 15 is pivotally connected, as at 17 to a bell crank 18 extending through a slot 19 formed in the end of the foot-board 3, said bell crank being fulcrumed under the foot-board 3 upon a bracket 20, carried by the inner side of the frame 1 adjacent to the reach rod 15. The short arm of the bell crank 18 is pivotally connected, as at 21, to a rod 22 provided with a turnbuckle 23, and this rod is pivotally connected, as at 24, to an arm 25 having trunnions 26 movably mounted in depending brackets 27, carried by a plate 28 secured to the bottom of the foot-board 3. The plate 28 has an opening 29 providing clearance for the upper end of the arm 25 and pivotally connected to the upper end of said arm by a pin 30 is the shank 31 of a tread plate 32. The shank 31 extends upwardly through an opening 33 in the foot-board 3 and through a slot 34 formed in a plate 35 mounted in the upper side of the foot-board 3. The lower wall of the slot 34 inclines to a point midway the ends of said slot and at this point the wall is provided with a notch 36. The shank 31 of the tread plate 32 normally engages in the notch 36 and is held therein by a flat spring 37 mounted upon the arm 25, said spring engaging the wall of the slot 34 and normally holding the shank 31 in a fixed position, whereby the lamps or headlights 10 will cast their rays of light directly in front of the machine.

The operator of the machine by a movement of the foot can easily swing the shank 31 of the tread plate 32 to either end of the slot 34 and through the medium of the connections previously described shift the lamps or headlights 10 either to one side of the road or street or to the other. By removing the foot the shank 31 is adapted to assume its normal position within the notch 36.

My invention is not limited to the position of the lamps or headlights, to the location of the tread plate 32 or to any other changes or modifications that fall within the scope of the appended claim.

What I claim, is:

The combination with the side frames of an automobile and a foot-board carried thereby, of brackets secured to each of said side frames, lamp supports movably mounted in said brackets and each having its lower end formed with a crank arm, a rod pivotally connected to each of said cranks, whereby when one of said cranks is actuated to move its respective support, the other support will be moved in unison, a crank arm projecting from one of said supports, a rearwardly-extending reach rod attached to said last mentioned crank arm, a bell crank lever having one of its ends pivoted to said reach arm, a support depending from the foot-board, a vertically disposed arm extending through the foot-board and trunnioned in said support, and a rod for connecting the other arm of said bell crank lever to said trunnion arm.

In testimony whereof I affix my signature in the presence of two witnesses.

FRANCIS J. MADDEN.

Witnesses:
MAX H. SROLOVITZ,
K. H. BUTLER.